(12) United States Patent
Lee et al.

(10) Patent No.: US 9,544,350 B2
(45) Date of Patent: Jan. 10, 2017

(54) RUI SYSTEM, RUI SERVER, RUI TERMINAL APPARATUS AND CONTROLLING METHOD THEREOF

(71) Applicant: SAMSUNG ELECTRONICS CO., LTD., Suwon-si (KR)

(72) Inventors: Dai-boong Lee, Hwaseong-si (KR); Se-dong Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 14/186,427

(22) Filed: Feb. 21, 2014

(65) Prior Publication Data
US 2014/0379867 A1  Dec. 25, 2014

(30) Foreign Application Priority Data
Jun. 25, 2013 (KR) .................. 10-2013-0073242

(51) Int. Cl.
H04L 29/06 (2006.01)
H04N 21/4402 (2011.01)
H04N 21/845 (2011.01)
H04N 21/2343 (2011.01)

(52) U.S. Cl.
CPC .......... *H04L 65/607* (2013.01); *H04L 65/4084* (2013.01); *H04L 65/604* (2013.01); *H04L 65/605* (2013.01); *H04N 21/440218* (2013.01); *H04N 21/845* (2013.01); *H04N 21/234309* (2013.01)

(58) Field of Classification Search
CPC .................................... H04N 21/845
USPC ........................................... 709/219
See application file for complete search history.

(56) References Cited

U.S. PATENT DOCUMENTS

2003/0158913 A1\* 8/2003 Agnoli ............... H04L 29/06 709/219
2011/0040894 A1\* 2/2011 Shrum, Jr. .......... H04L 65/4084 709/246

FOREIGN PATENT DOCUMENTS

WO  2009034483 A1  3/2009

OTHER PUBLICATIONS

Communication dated May 16, 2014, issued by the European Patent Office in counterpart European Application No. 14158665.1.

\* cited by examiner

*Primary Examiner* — David Lazaro
*Assistant Examiner* — Zia Khurshid
(74) *Attorney, Agent, or Firm* — Sughrue Mion, PLLC (57) ABSTRACT

A remote user interface (RUI) system, an RUI server, an RUI terminal apparatus and a controlling method are provided. The controlling method of the RUI server includes receiving stream data from an external server in response to streaming service request information being received a requesting RUI terminal apparatus among a plurality of RUI terminal apparatuses, determining whether it is possible perform, in the RUI server, trans-coding of the received stream data, and performing, based on a result of the determining, at least one of trans-coding the stream data, and transmitting trans-coding process information regarding the received stream data to RUI terminal apparatuses that can perform trans-coding among the plurality of RUI terminal apparatuses, other than the requesting RUI terminal apparatus.

20 Claims, 6 Drawing Sheets

RUI SYSTEM, RUI SERVER, RUI TERMINAL APPARATUS AND CONTROLLING METHOD THEREOF

CROSS-REFERENCE TO RELATED APPLICATION(S)

This application claims priority from Korean Patent Application No. 10-2013-0073242, filed on Jun. 25, 2013 in the Korean Intellectual Property Office, the disclosure of which is incorporated herein by reference in its entirety.

BACKGROUND

1. Field

Apparatuses and methods consistent with exemplary embodiments relate to a remote user interface (RUI) system, an RUI server, an RUI terminal apparatus and a controlling method thereof, and more specifically, to an RUI system configured to utilize trans-coding resources of an RUI terminal apparatus, an RUI server, an RUI terminal apparatus and a controlling method thereof.

2. Description of the Related Art

In an RUI service environment, an RUI server generally receives stream data regarding contents related with a service request from an external server according to a streaming service request of an RUI terminal apparatus. Thereafter, the RUI server trans-codes and transmits the stream data received from the external server in a format supported by the RUI terminal apparatus requesting the streaming service. Thus, when the trans-coded stream data is received from RUI server, the RUI terminal apparatus may perform signal-processing, such as decoding the received stream data, and output the same as image and audio signals.

The RUI server may simultaneously trans-code stream data in formats supported by a plurality of RUI terminal apparatuses using resources available for trans-coding. However, the RUI server has limited resources available for trans-coding. Thus, when another RUI terminal apparatus requests a streaming service while the RUI server is simultaneously trans-coding stream data in formats supported by a plurality of RUI terminal apparatuses, the RUI server may not be able provide the requested service to the corresponding RUI terminal apparatus because of a lack of available trans-coding resources.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide an RUI service by utilizing trans-coding resources of one or more RUI terminal apparatuses among a plurality of RUI terminal apparatuses when the RUI server is short of available trans-coding resources.

According to an aspect of an exemplary embodiment, there is provided a controlling method of a remote user interface (RUI) server in an RUI service environment, including: receiving stream data from an external server in response to streaming service request information being received from a requesting RUI terminal apparatus among a plurality of RUI terminal apparatuses; determining whether it is possible to perform, in the RUI server, trans-coding of the received stream data; and performing, based on a result of the determining, at least one of trans-coding the received stream data, and transmitting trans-coding process information regarding the received stream data to RUI terminal apparatuses that can perform trans-coding among the plurality of RUI terminal apparatuses, other than the requesting RUI terminal apparatus.

The streaming service request information may include at least one of contents information, identifier information, and format specification information regarding the requesting RUI terminal apparatus.

The determining may include: determining whether it is necessary to trans-code the received stream data based on the format specification information included in the streaming service request information; and transmitting the received stream data to the requesting RUI terminal apparatus in response to it being determined that trans-coding is unnecessary, or determining whether there are available trans-coding resources to trans-code the received stream data in response to it being determined that trans-coding is necessary.

The trans-coding the received stream data may include: trans-coding the received stream data into a format corresponding to the format specification information in response to it being determined that there are available trans-coding resources; and transmitting the trans-coded stream data to the requesting RUI terminal apparatus.

The transmitting the trans-coded process information may further include: transmitting a request for requesting a remaining amount of trans-coding resources to the RUI terminal apparatuses other than the requesting RUI terminal apparatus, in response to it being determined that there are no available trans-coding resources; receiving answering messages from answering RUI terminal apparatuses that can provide trans-coding resources among the RUI terminal apparatuses; and transmitting the trans-coding process information regarding the received stream data to the answering RUI terminal apparatuses which transmit the answering messages.

The trans-coding process information may include the received stream data, identifier information, and format specification information regarding the requesting RUI terminal apparatus, and the answering RUI terminal apparatuses which receive the trans-coding process information perform trans-coding of the received stream data based on the received stream data and the format specification information included in the trans-coding process information, and transmit the trans-coded stream data to the requesting RUI terminal apparatus based on the identifier information.

The transmitting the trans-coded process information may further include: transmitting, to the requesting RUI terminal apparatus, a message informing the requesting RUI terminal apparatus that a streaming service corresponding to the streaming service request information cannot be provided, in response to the answering messages not being received from any of the RUI terminal apparatuses receiving the request for the remaining amount of trans-coding resources.

Accordingly to an aspect of another exemplary embodiment, there is provided a controlling method of a first remote user interface (RUI) terminal apparatus in RUI service environment, including: transmitting, to an RUI server, an answering message regarding available trans-coding resources of the first RUI terminal apparatus, in response to receiving a request from the RUI server; trans-coding stream data into a format of a second RUI terminal apparatus which requests a streaming service, based on received trans-coding process information, in response to the trans-coding process information including the stream data being received from the RUI server; and transmitting the trans-coded stream data to the second RUI terminal apparatus.

The trans-coding process information may further include identifier information and format specification information regarding the second RUI terminal apparatus.

Accordingly to an aspect of another exemplary embodiment, there is provided a remote user interface (RUI) server, including: a communicator configured to perform communication with one or more RUI terminal apparatuses among a plurality of RUI terminal apparatuses regarding a streaming service; a receiver configured to receive, from an external server, stream data regarding contents related to streaming service request information received from a requesting RUI terminal apparatus among the plurality of RUI terminal apparatuses; a trans-coder configured to trans-code the received stream data; a determiner configured to determine whether it is possible to trans-code the received stream data in RUI server, in response to the stream data being received; and a controller configured to, based on a result of the determining, control at least one of the trans-coder to perform trans-coding of the received stream data, and the communicator to transmit trans-coding process information regarding the received stream data to RUI terminal apparatuses that can perform trans-coding among the plurality of RUI terminal apparatuses, other than the requesting RUI terminal apparatus.

The streaming service request information may include at least one of contents information, identifier information, and format specification information regarding the requesting RUI terminal apparatus.

The determiner may be further configured to determine whether it is necessary to trans-code the received stream data based on format specification information included in the streaming service request information, and the controller may be further configured to, in response to it being determined that trans-coding in unnecessary, transmit the received stream data to the requesting RUI terminal apparatus.

The determiner may be further configured to, in response to it being determined that trans-coding is necessary, determine whether there are available trans-coding resources, and the controller may be further configured to, in response to it being determined that there are available trans-coding resources, perform trans-coding of the received stream data into a format corresponding to the format specification information, and transmit the trans-coded received stream data to the requesting RUI terminal apparatus.

The controller may be further configured to, in response to it being determined that there are no available trans-coding resources, transmit a request for a remaining amount of trans-coding resources to the RUI terminal apparatuses other than the requesting RUI terminal apparatus, and transmit trans-coding process information regarding received the stream data to answering RUI terminal apparatuses among the RUI terminal apparatuses that transmit answering messages in response to the answering messages being received.

The trans-coding process information may include the stream data, identifier information, and format specification information of the requesting RUI terminal apparatus, and the answering RUI terminal apparatuses which receive the trans-coding process information may be configured to perform trans-coding of the received stream data based on the received stream data and the format specification information included in the trans-coding process information, and transmit the trans-coded stream data to the requesting RUI terminal apparatus based on the identifier information.

The controller may be further configured to transmit, to the requesting RUI terminal apparatus, a message informing the requesting RUI terminal apparatus that a streaming service regarding the contents cannot be provided, in response to an answering message not being received from any of the RUI terminal apparatuses receiving the request for the remaining amount of trans-coding resources.

Accordingly to an aspect of another exemplary embodiment, there is provided a remote user interface (RUI) terminal apparatus, including: a communicator configured to perform communication with an RUI server; a trans-coder configured to perform trans-coding; and a controller configured to control the communicator to transmit, to the RUI server, an answering message regarding available trans-coding resources of the RUI terminal apparatus in response to a request from the RUI server, control the trans-coder to trans-code stream data into a format of another requesting RUI terminal apparatus requesting a streaming service based on received trans-coding process information, and control the communication to transmit the trans-coded stream data to the requesting RUI terminal apparatus in response to the trans-coding process information including the stream data being received from the RUI server.

The trans-coding process information may further include identifier information and format specification information regarding the requesting RUI terminal apparatus.

Accordingly to an aspect of another exemplary embodiment, there is provided a remote user interface (RUI) system configured to provide an RUI service, including: an RUI server configured to trans-code stream data regarding contents received from an external server, and transmit the trans-coded stream data to a requesting RUI terminal apparatus which requests a streaming service among a plurality of RUI terminal apparatuses; and the requesting RUI terminal apparatus is configured to signal-process the stream data trans-coded by the RUI server and output a result of the signal-processing, wherein the RUI server is further configured to transmit trans-coding process information regarding the received stream data to RUI terminal apparatuses that can provide available trans-coding resources among the plurality of RUI terminal apparatuses other than the requesting RUI terminal apparatus, in response to streaming service request information being received from the requesting RUI terminal apparatus and there being no available resources for trans-coding the received stream data related with the streaming service.

The trans-coding process information may include stream data, identifier information, and format specification information regarding the contents related with the streaming service requested from the requesting RUI terminal apparatus, and the RUI terminal apparatuses may be further configured to trans-code the received stream data based on the received stream data and the format specification information included in the trans-coding process information in response to the trans-coding process information being received from the RUI server, and transmit the trans-coded stream data to the requesting RUI terminal apparatus based on the identifier information.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, same drawing reference numerals are used for the same elements, even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the exemplary embodiments with unnecessary detail.

Figure 1:
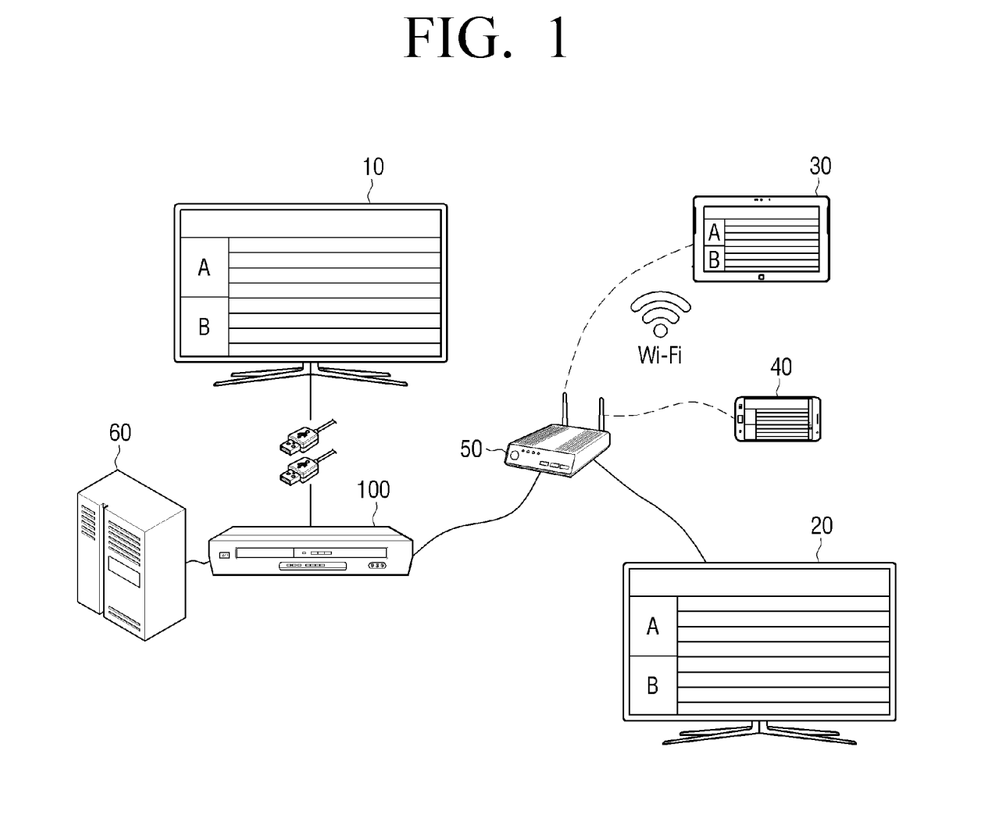
FIG. 1 illustrates an RUI system which provides an RUI service according to an exemplary embodiment.

FIG. 1 illustrates an RUI system which provides an RUI service according to an exemplary embodiment.

Referring to FIG. 1, an RUI system providing an RUI service includes an RUI server 100 and a first to a fourth RUI terminal apparatuses 10, 20, 30 and 40. The RUI server 100 may be a broadcasting receiver such as set-top box, and the first to the fourth RUI terminal apparatuses 10, 20, 30 and 40 may be display apparatuses such as smart televisions (TVs), smart phones, and tablet personal computers (PCs). According to an exemplary embodiment, the RUI server 100 may perform data communication through an interface such as a high definition multimedia interface (HDMI) with the first RUI terminal apparatus 10. Further, the RUI server 100 may perform wired or wireless data communication through a mediator 50 with the second to the fourth RUI terminal apparatuses 20, 30 and 40 which are sub-terminal apparatuses.

The RUI server 100 receives, from an external server 60, stream data of contents corresponding to a streaming service request transmitted to the external server 60 according to a streaming service request of one or more RUI apparatuses from among the first to the fourth RUI terminal apparatuses 10, 20, 30 and 40. Thereafter, the RUI server 100 trans-codes the received stream data, and transmits the trans-coded stream data to the corresponding one of RUI terminal apparatuses.

According to an exemplary embodiment, the RUI server 100 may provide a streaming service to the first to the third RUI terminal apparatus 10, 20 and 30 from among the first to the fourth RUI terminal apparatuses 10, 20, 30 and 40. In this case, the RUI server 100 trans-codes stream data of the contents received from the external server 60 based on format specifications of the first to the third RUI terminal apparatuses 10, 20 and 30. Thereafter, the RUI server 100 transmits the trans-coded stream data, trans-coded so as to be suitable for each format specification of the first to the third RUI terminal apparatuses 10, 20 and 30, to the first to the third RUI terminal apparatuses 10, 20 and 30. Thus, the first to the third RUI terminal apparatuses 10, 20 and 30 may perform signal-processing, such as decoding the trans-coded stream data so as to be suitable for each format specification of the respective terminal apparatuses, and output the same in image and audio signals.

The stream data of the contents received from the external server 60 are compressed by codecs which are distinguished according to specific compression standards or compression methods. Decoding the encoded stream data by a specific codec and encoding them by new another codec are called as trans-coding.

For example, among the above first to the third RUI terminal apparatuses 10, 20 and 30, the first RUI terminal apparatus 10 may support an MPEG-4 format, the second RUI terminal apparatus 20 may support an MP4 format, and the third RUI terminal apparatus 30 may support an AVI format. Meanwhile, the stream data received from the external server 60 may be compressed data according to an MPEG-2 method. In this case, the RUI server 100 trans-codes the compressed stream data by the MPEG-2 method so as to be suitable for the formats of the first to the third RUI terminal apparatuses 10, 20 and 30.

As described above, the RUI server 100 may trans-code the stream data which is compressed by the MPEG-2 method into the MPEG-4 format for the first RUI terminal apparatus 10, and transmit the trans-coded stream data to the first RUI terminal apparatus 10. Further, the RUI server 100 may trans-code the stream data which is compressed by the MPEG-2 method into the MP4 format for the second RUI terminal apparatus 20, and transmit the trans-coded stream data to the second RUI terminal apparatus 20. Further, the RUI server 100 may trans-code the stream data which is compressed by the MPEG-2 method into the AVI format for the third RUI terminal apparatus 30, and transmit the trans-coded stream data to the third RUI terminal apparatus 30.

Therefore, the first to the third RUI terminal apparatuses 10, 20 and 30 may perform signal-processing, such as decoding the stream data which is trans-coded into the format supported by each terminal apparatus, and output the same in image and audio signals.

The RUI server 100 may receive, from the fourth RUI terminal apparatus 40, streaming service request information while trans-coding the stream data received from the external server 60 and transmitting the trans-coding the stream data to the first to the third RUI terminal apparatus 10~30.

In this case, the RUI server 100 determines whether or not stream data of the contents requested by the fourth RUI terminal apparatus 40 can be trans-coded. In other words, the RUI server 100 determines whether or not trans-coding resources can be provided when the streaming service request information is received from the fourth RUI terminal apparatus 40. When it is determined that trans-coding resources can be provided, the RUI server 100 receives, from the external server 60, stream data regarding the contents requested by the fourth RUI terminal apparatus 40. Thereafter, the RUI server 100 trans-codes the received stream data into the format supported by the fourth RUI terminal apparatus 40, and transmits the trans-coded stream data to the fourth RUI terminal apparatus 40.

When it is determined that trans-coding resources cannot be provided, the RUI server 100 transmits a trans-coding request to the RUI terminal apparatuses among the first to the third RUI terminal apparatuses 10, 20 and 30. According to an exemplary embodiment, when all of the first to the third RUI terminal apparatuses 10, 20 and 30 can provide trans-coding resources, the RUI server 100 may request that the RUI terminal apparatus which has the best trans-coding performance among the first to the third RUI terminal apparatuses 10, 20 and 30 provide the trans-coding. For example, when the first RUI terminal apparatus 10 has the best trans-coding performance, the RUI server 100 may request that the first RUI terminal apparatus 10 provide the trans-coding. In order to request the trans-coding, the RUI server 100 may transmit, to the first RUI terminal apparatus 10, the stream data regarding the contents requested by the fourth RUI terminal apparatus 40, format specification information, and identifier information (or address information) of the fourth RUI terminal apparatus 40.

Thus, the first RUI terminal apparatus 10 trans-codes the stream data received from the RUI server 100 based on the format specification information of the fourth RUI terminal apparatus 40. Thereafter, the first RUI terminal apparatus 10 transmits the trans-coded stream data to the fourth RUI terminal apparatus 40.

Thus, an RUI system according to exemplary embodiments may provide an RUI service such as streaming service to surrounding RUI terminal apparatuses in an environment where there is a shortage of resources available for trans-coding stream data. The above briefly describes an RUI system which provides an RUI service according to exemplary embodiments. The following will explain the RUI server 100 in further detail.

Figure 2:
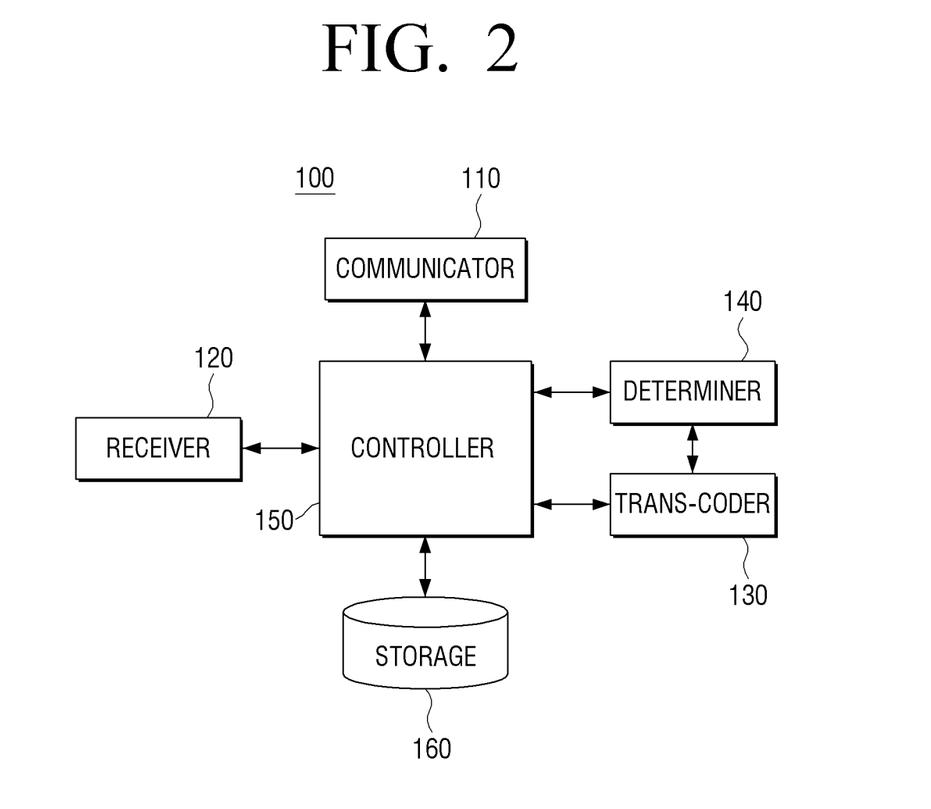
FIG. 2 is a block diagram of an RUI server according to an exemplary embodiment.

FIG. 2 is a block diagram of the RUI server 100 according to an exemplary embodiment.

Referring to FIG. 2, the RUI server 100 includes a communicator 110, a receiver 120, a trans-coder 130, a determiner 140, a controller 150, and a storage 160.

The communicator 110 performs communication related with a streaming service with one or more RUI terminal apparatuses among the first to the fourth RUI terminal apparatuses 10, 20, 30 and 40 described above. The communicator 110, which performs communication with the first to the fourth RUI terminal apparatuses 10~40, may communicate with the first RUI terminal apparatus 10 through an interface such as HDMI, and communicate with the second to the fourth RUI terminal apparatuses 20~40 by utilizing various communication methods such as wire/wireless local area network (LAN), Wifi, WAN, Ethernet, Bluetooth, Zig-bee, universal serial bus (USB), and IEEE 1394, as described above.

The receiver 120 receives stream data of contents provided from the external server 60. Specifically, the receiver 120 may receive, from the external server 60, stream data of the contents related with the received streaming service request information, when streaming service request information is received from one or more RUI terminal apparatuses among the first to the fourth RUI terminal apparatuses 10, 20, 30 and 40.

For the above process, the receiver 120 may include one or more tuners (not illustrated) and receive stream data of contents from selected channels through one or more tuners (not illustrated). For example, the receiver 120 may receive stream data of contents based on the received streaming service request information, when the streaming service request information is received from the fourth RUI terminal apparatus 40 among the first to the fourth RUI terminal apparatuses 10, 20, 30 and 40. Herein, the streaming service request information may include one or more of contents information, identifier information, and format specification information of the fourth RUI terminal apparatus 40 requesting a streaming service.

Thus, the receiver 120 may select channels which provide corresponding contents based on contents information included in the streaming service request information, and receive stream data of the corresponding contents from the selected channels. The receiver 120 may include a plurality of tuners (not illustrated). Therefore, when a plurality of streaming service request information different with each other is received from at least two RUI terminal apparatuses among the first to the fourth RUI terminal apparatuses 10, 20, 30 and 40, the receiver 120 may receive, through the plurality of tuners (not illustrated), stream data of the contents requested from each of RUI terminal apparatuses.

The trans-coder 130 trans-codes the stream data received from the receiver 120. As described above, when streaming service request information is received from the fourth RUI terminal apparatus 40, the receiver 120 receives stream data of the contents requested by the fourth RUI terminal apparatus 40 based on the received streaming service request information. When such stream data is received, the trans-coder 130 trans-codes the received stream data based on format specification information of the fourth RUI terminal apparatus 40 included in the streaming service request information.

For example, the stream data received from the receiver 120 may be data compressed according to an MPEG-2 method, and the fourth RUI terminal apparatus 40 may support an MPEG-4 format. In this case, the trans-coder 130 may trans-code the stream data which is compressed according to the MPEG-2 method into the MPEG-4 format.

The determiner 140 determines whether or not it is possible to trans-code the stream data in the RUI server 100, when streaming service request information is received from one or more RUI terminal apparatuses among the first to the fourth RUI terminal apparatuses 10, 20, 30 and 40.

According to the determined result, the controller 150 controls the trans-coder 130 to perform trans-coding regarding the received stream data or request trans-coding regarding the received stream data from the other RUI terminal apparatuses (i.e., the RUI terminal apparatus requesting the streaming service is excluded) that can perform trans-coding.

As described above, when streaming service request information is received from the fourth RUI terminal apparatus 40 among the first to the fourth RUI terminal apparatuses 10, 20, 30 and 40, the receiver 120 receives stream data regarding the contents that the fourth RUI terminal apparatus 40 requests. When the stream data is received, the determiner 140 determines whether or not the received stream data needs to be trans-coded based on format specification information included in the received streaming service request information. Thus, the determiner 140 determines whether or not trans-coding the received stream data is needed or not by comparing the format of the received stream data with the format supported by the fourth RUI terminal apparatus 40.

For example, the received stream data may be compressed by an MPEG-2 method, and the fourth RUI terminal apparatus 40 may support an MPEG-2 format. In this case, the determiner 140 determines that the received stream data is compressed in a format which is suitable for the fourth RUI terminal apparatus 40. Thus, the determiner 140 determines that trans-coding the received stream data is unnecessary. When trans-coding is determined to be unnecessary, the controller 150 may transmit the received stream data through the receiver 120 to the fourth RUI terminal apparatus 40.

Similarly, the received stream data may be compressed according to an MPEG-2 method, and the fourth RUI terminal apparatus 40 may support an MPEG-4 format. In this case, the determiner 140 determines that it is necessary to trans-code the received stream data. Therefore, if the format of the received stream data is different from the format supported by the fourth RUI terminal apparatus 40, the determiner 140 determines whether or not trans-coding resources can be provided. In other words, the determiner 140 determines whether or not trans-coding can be performed in the trans-coder 130.

For example, the trans-coder 130 may perform trans-coding regarding stream data that will be simultaneously transmitted to up to a maximum of three RUI terminal apparatuses, and perform trans-coding of the stream data of the contents currently requested by the first RUI terminal apparatus 10 among the first to the third RUI terminal apparatuses 10, 20 and 30. In this case, the determiner 140 may confirm current trans-coding processes and determine that trans-coding can be performed in the trans-coder 130.

Thereby, when there are available trans-coding resources, the controller 150 controls the trans-coder 130 and the communicator 110 to trans-code the stream data requested by the fourth RUI terminal apparatus 40 into a format corresponding to format specification information of the fourth RUI terminal apparatus 40 requesting a streaming service, and transmit the trans-coded stream data to the fourth RUI terminal apparatus 40. Thus, the trans-coder 130 may trans-code the received stream data in a format corresponding to the format specification information of the fourth RUI terminal apparatus 40, and the communicator 110 may transmit the trans-coded stream data to the fourth RUI terminal apparatus 40.

When the determiner 140 determines that there are no available trans-coding resources, the controller 150 requests, from the other RUI terminal apparatuses (i.e., the RUI terminal apparatus 40 requesting the streaming service is excluded), the remaining amount of trans-coding resources of the other RUI terminal apparatuses. Thereafter, when answering messages are received from one or more RUI terminal apparatuses among the RUI terminal apparatuses requested for the remaining amount of trans-coding resources, the controller 150 transmits trans-coding process information regarding corresponding stream data to RUI terminal apparatuses transmitting answering messages.

For example, when the trans-coder 130 performs trans-coding regarding stream data of the contents requested by the first to the third RUI terminal apparatuses 10~30, the determiner 140 may determine that there is no trans-coding available resources. In this case, the controller 150 requests the remaining amount of trans-coding resources of one or more RUI terminal apparatuses among the first to the third RUI terminal apparatuses 10, 20 and 30 based on previously stored terminal information of the first to the third RUI terminal apparatuses 10, 20 and 30 in the storage 160. Specifically, the storage 160 may store terminal information of the first to the fourth RUI terminal apparatuses which are previously registered. Herein, the terminal information may include address information, identifier information, and performance information of the first to the fourth RUI terminal information 10~40. Thus, the controller 150 may request remaining amount of trans-coding resources of RUI terminal apparatuses that can perform trans-coding among the first to the third RUI terminal apparatuses 10, 20 and 30, based on the terminal information stored in the storage 160. Herein, the trans-coding process information may include one or more of stream data regarding the contents requested by the fourth RUI terminal apparatus 40, identifier information (or address information), and format specification information.

For example, when the first to the third RUI terminal apparatuses 10~30 can perform trans-coding, the controller 150 may request remaining amount of trans-coding resources of the first to the third RUI terminal apparatuses 10~30. Thereafter, when answering messages are received from one or more RUI terminal apparatuses among the first to the third RUI terminal apparatuses 10~30, the controller 150 transmits trans-coding process information regarding the stream data to RUI terminal apparatuses transmitting answering messages. Herein, the answering messages may include amount information regarding available trans-coding resources.

Thus, when answering messages are received from at least two RUI terminal apparatuses among the first to the third RUI terminal apparatuses 10~30 which are requested for remaining amount of trans-coding resources, the controller 150 may transmit trans-coding process information to RUI terminal apparatus which has the most amount of available trans-coding resources based on the amount information of available trans-coding resources included in the received answering messages.

However, exemplary embodiments are not limited to herein: when answering messages are received from at least two RUI terminal apparatuses, the controller 150 may transmit trans-coding process information to RUI terminal apparatus which is the best performer among RUI terminal apparatuses transmitting the answering messages based on the previously stored terminal information in the storage 160. For example, answering messages may be received from the first to the third RUI terminal apparatuses 10~30, and the first RUI terminal apparatus 10 may be the best performer in trans-coding among the first to the third RUI terminal apparatuses 10~30. In this case, the controller 150 may transmit trans-coding process information to the first RUI terminal apparatus 10.

Thus, RUI terminal apparatus receiving the trans-coding process information may trans-code the stream data into a format that can be supported by the fourth RUI terminal apparatus 40 based on the received trans-coding process information, and transmit the trans-coded stream data to the fourth RUI terminal apparatus 40. Meanwhile, if an answering message is not received from RUI terminal apparatuses which receive a request for the remaining amount of trans-coding resources, the controller 150 transmits, to the fourth RUI terminal apparatus 40 which requested the streaming service, a message informing the fourth RUI terminal apparatus 40 that a streaming service cannot be provided.

The following will describe RUI terminal apparatus 200. Herein, the RUI terminal apparatus 200 may be the first RUI terminal apparatus 10 described above. However, exemplary embodiments are not limited to herein: the RUI terminal apparatus 200 may be one of the second to the fourth RUI terminal apparatuses 20~40. Exemplary embodiments will be described by assuming that the first RUI terminal apparatus 10 described above is the RUI terminal apparatus 200.

Figure 3:
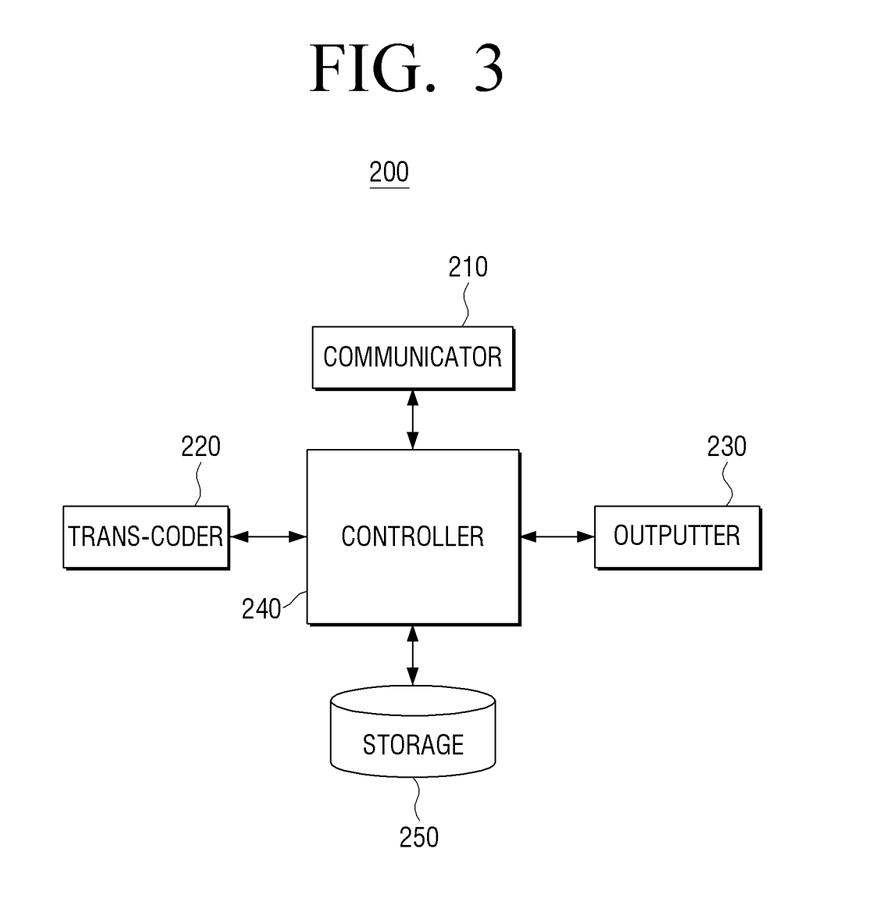
FIG. 3 is a block diagram of an RUI terminal apparatus according to an exemplary embodiment.

FIG. 3 is a block diagram of the RUI terminal apparatus 200 according to an exemplary embodiment.

Referring to FIG. 3, RUI terminal apparatus 200 includes a communicator 210, a trans-coder 220, an outputter 230, a controller 240, and a storage 250.

The communicator 210 performs communication with the RUI server 100 and with other surrounding RUI terminal apparatuses 200. The communicator 210, which performs communication with one or more RUI terminal apparatuses among the RUI server 100 and other RUI terminal apparatuses 200, may perform communication with the RUI server 100 through an interface such as HDMI or with other RUI terminal apparatuses 200 by utilizing various nearfield wireless communication methods such as Wifi, WAN, Ethernet, Bluetooth, and Zigbee.

The communicator 210 requests, from the RUI server 100, a streaming service regarding the contents requested by a user, and receives the trans-coded stream data regarding corresponding contents. The trans-coded stream data may be temporarily stored in the storage 250, such as buffer, and the controller 240 performs signal-processing such as decoding regarding the temporarily stored trans-coded stream data to generate image and audio signals. Therefore, the outputter 230 may output the signal-processed image and audio signals through a display (not illustrated) and a speaker (not illustrated).

When a request for the remaining amount of trans-coding resources is received from the RUI server 100 through the communicator 210, the controller 240 determines whether or not there are available trans-coding resources of the RUI terminal apparatus 200. Specifically, the controller 240 may determine whether trans-coding can be performed in the trans-coder 220 by confirming trans-coding processes of the trans-coder which performs trans-coding of stream data.

For example, the trans-coder 220 may perform trans-coding regarding stream data which will be simultaneously transmitted to the other three RUI terminal apparatuses at maximum, or may not be currently performing trans-coding. When the controller 240 determines that trans-coding can be performed in the trans-coder 220, the controller 240 transmits an answering message regarding available trans-coding resources to the RUI server 100. However, when trans-coding cannot be performed in the trans-coder 220, the controller 240 may not transmit a separate answering message to the RUI server 100.

When trans-coding process information including stream data is received from the RUI server 100 after transmitting an answering message regarding available trans-coding resources to the RUI server 100, the controller 240 controls the trans-coder 220 to trans-code the received stream data, in a format of the other RUI terminal apparatus 200 which requests a streaming service, based on the received trans-coding process information. Herein, the trans-coding process information may further include identifier information (or address information) and format specification information of the other terminal apparatus 200 requesting a streaming service. Thus, the trans-coder 220 trans-codes corresponding stream data in a format corresponding to the format specification information included in the trans-coding process information.

For example, the stream data included in the trans-coding process information may be data compressed by MPEG-2, and the other RUI terminal apparatus 200 requesting a streaming service may support the format of an MPEG-4 method. In this case, the trans-coder 220 trans-codes the compressed stream data by MPEG-2 into the format of MPEG-4. Thereafter, the communicator 210 transmits the stream data trans-coded by the trans-coder 220 to the other RUI terminal apparatus 200 requesting a streaming service according to a controlling command of the controller 240. Thus, the other RUI terminal apparatus 200 requesting a streaming service may receive and output the trans-coded stream data regarding the contents requested by itself from the RUI terminal apparatus 200.

The above explains the RUI server 100 and RUI terminal apparatus 200 in detail according to exemplary embodiments. The following will describe a controlling method of the RUI server 100 and RUI terminal apparatus 200 in detail according to exemplary embodiments.

Figure 4:
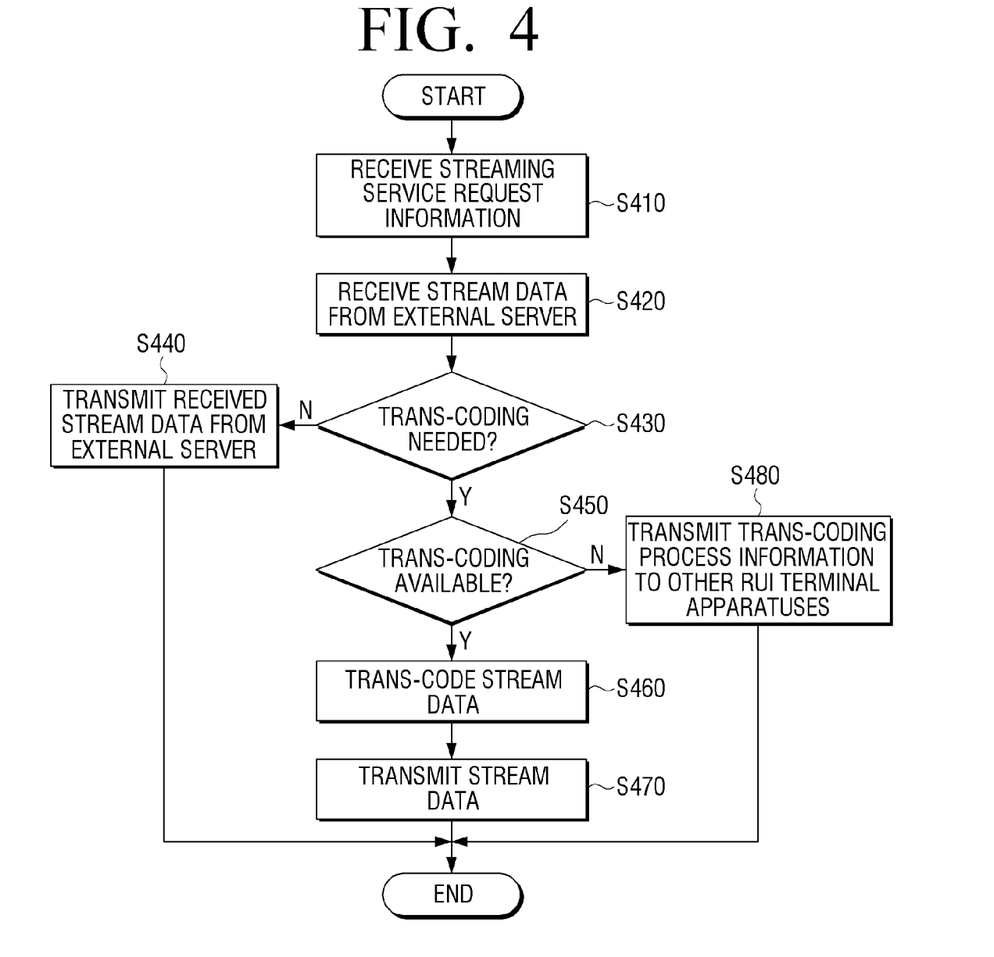
FIG. 4 is a flowchart of a method which controls an RUI server in an RUI service environment according to an exemplary embodiment.

FIG. 4 is a flowchart describing a method for controlling an RUI server in an RUI service environment according to an exemplary embodiment.

Referring to FIG. 4, the RUI server 100 may receive streaming service request information regarding contents from one or more RUI terminal apparatuses among the plurality of RUI terminal apparatuses, at S410. Herein, the streaming service request information may include one or more of contents information, identifier information, and format specification information regarding the RUI terminal apparatus requesting a streaming service. For example, the plurality of RUI terminal apparatuses may be the first to the fourth RUI terminal apparatuses 10, 20, 30 and 40 described above, and the RUI terminal apparatus requesting the streaming service may be the fourth RUI terminal apparatus 40.

When the streaming service request information is received, the RUI server 100 receives, from the external server 60, stream data regarding corresponding contents based on the contents information included in the received streaming service request information, at S420. When stream data of the contents requested by the fourth RUI terminal apparatus 40 are received, the RUI server 100 determines whether or not the received stream data can be trans-coded in the RUI server 100.

Specifically, the RUI server 100 determines whether or not the stream data received from the external server 60 needs to be trans-coded based on the format specification information included in the streaming service request information received from the fourth RUI terminal apparatus 40, at S430. In other words, the RUI server 100 determines whether or not the format method of the received stream data corresponds to the format method supported by the fourth RUI terminal apparatus 40.

When it is determined that the two format methods correspond with each other, the RUI server 100 determines that trans-coding the received stream data is unnecessary, and transmits, to the fourth RUI terminal apparatus 40, the stream data received from the external server 60 without separate trans-coding, at S440.

When the two format methods are determined to be different from each other, the RUI server 100 determines that trans-coding the received stream data is necessary, and determines whether or not there are available trans-coding resources for corresponding stream data, at S450. When it is determined that there are available trans-coding resources, the RUI server 100 trans-codes the stream data received from the external server 60 into the format supported by the fourth RUI terminal apparatus 40, and transmits the trans-coded stream data to the fourth RUI terminal apparatus 40, at S460 and S470.

When it is determined that there are no available trans-coding resources, the RUI server 100 transmits trans-coding process information regarding corresponding stream data to the other RUI terminal apparatuses (i.e., the fourth RUI terminal apparatus 40 is excluded), at S480.

The following will describe in further detail, a method for transmitting the trans-coded stream data to the fourth RUI terminal apparatus 40 requesting a streaming service when the RUI server 100 according to exemplary embodiments has no available trans-coding resources.

Figure 5:
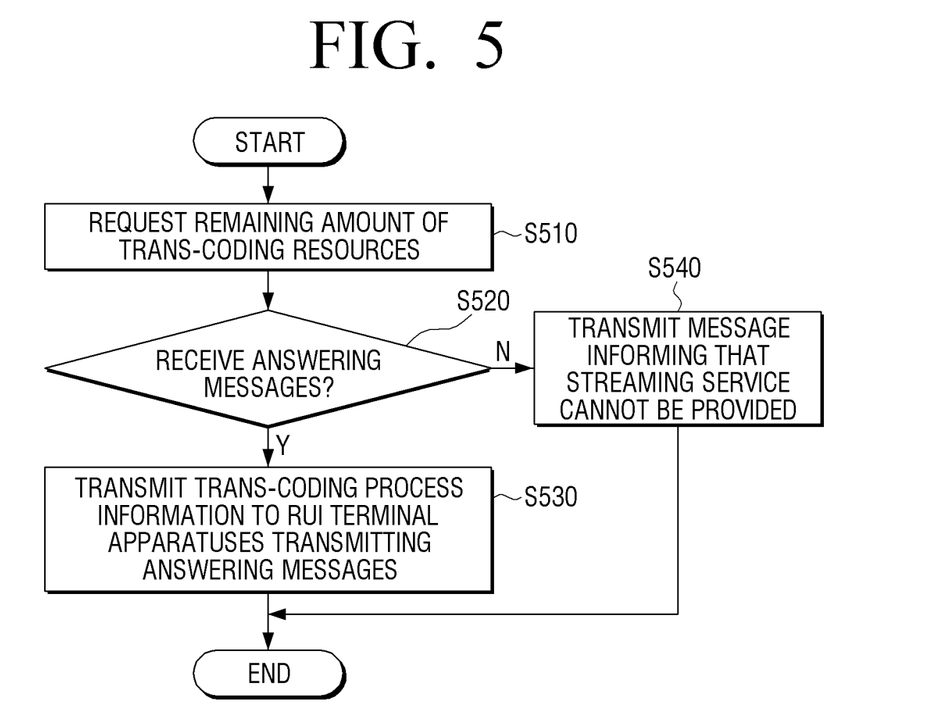
FIG. 5 is a flowchart of a method which transmits trans-coded stream data from an RUI server having no available trans-coding resources to an RUI terminal apparatus requesting a streaming service.

FIG. 5 is a flowchart describing the method which transmits the trans-coded stream data from RUI server having no available trans-coding resource to RUI terminal apparatus requesting a streaming service according to an exemplary embodiment.

Referring to FIG. 5, when there are no available trans-coding resources, the RUI server 100 transmits requests for the remaining amount of trans-coding resources to the other RUI terminal apparatuses (i.e., the fourth RUI terminal apparatus 40 requesting a streaming service is excluded), at S510. Thereafter, the RUI server 100 determines whether or not answering messages are received from one or more RUI terminal apparatuses among the RUI terminal apparatuses which receive a request for the remaining amount of trans-coding resources, at S520. When answering messages are received from one or more RUI terminal apparatuses among the RUI terminal apparatuses which receive a request for the remaining amount of trans-coding resources, the RUI server 100 transmits trans-coding process information regarding the stream data to the RUI terminal apparatuses transmitting the answering messages, at S530.

Herein, the trans-coding process information may include one or more of stream data regarding the contents received from the external server 60, identifier information (or address information), and format specification information regarding the fourth RUI terminal apparatus 40 requesting a streaming service.

As described above, the RUI server 100 may perform trans-coding regarding the stream data which will be simultaneously transmitted to the three RUI terminal apparatuses at maximum, and perform trans-coding regarding stream data of the contents currently requested by the first to the third RUI terminal apparatuses 10~30. In this case, the RUI server 100 may determine that there are no available trans-coding resources, and transmits requests for the remaining amount of trans-coding resources to the other RUI terminal apparatuses (i.e., excluding the fourth RUI terminal apparatus 40).

For example, the RUI server 100 transmits requests for the remaining amount of trans-coding resources to one or more RUI terminal apparatuses among the first to the third RUI terminal apparatuses 10, 20 and 30, based on the previously stored terminal information of the first to the third RUI terminal apparatuses 10, 20 and 30. Herein, the terminal information may include address information, identifier information, and performance information regarding the first to the fourth RUI terminal apparatuses 10~40. Thus, the RUI server 100 may transmit requests for amount information regarding trans-coding resources to RUI terminal apparatuses that can perform trans-coding among the first to the third RUI terminal apparatuses 10, 20 and 30 (i.e. the fourth RUI terminal apparatus 40 requesting a streaming service is excluded), based on the previously stored terminal information.

For example, when the first to the third RUI terminal apparatuses 10, 20 and 30 can perform trans-coding, the RUI server 100 may transmit requests for amount information of available trans-coding resources to the first to the third RUI terminal apparatuses 10, 20 and 30. Thereafter, when answering messages are received from one or more of the first to the third RUI terminal apparatuses 10, 20 and 30, the RUI server 100 transmits trans-coding process information to the RUI terminal apparatuses transmitting the answering messages. Herein, the answering messages may include amount information regarding available trans-coding resources.

Therefore, when answering messages are received from at least two RUI terminal apparatuses among the first to the third RUI terminal apparatuses 10, 20 and 30, the RUI server 100 may transmit trans-coding process information to the RUI terminal apparatus which has the most amount of available trans-coding resources based on the amount information of available trans-coding resources included in the received answering messages.

Thus, the RUI terminal apparatus receiving the trans-coding process information may trans-code the stream data into a format that can be supported by the fourth RUI terminal apparatus 40, based on the received trans-coding process information, and transmit the trans-coded stream data to the fourth RUI terminal apparatus 40.

When an answering message is not received from any of the RUI terminal apparatuses receiving a request for the remaining amount of trans-coding resources, the RUI server 100 transmits, to the fourth RUI terminal apparatus 40 requesting a streaming service, a message informing the fourth RUI terminal apparatus 40 that a streaming service cannot be provided, at S540.

The following will describe in further detail a method for controlling the RUI terminal apparatus 200 that transmits the trans-coded stream data to the other RUI terminal apparatuses 200. Herein, the RUI terminal apparatus 200 may be the first RUI terminal apparatus 10 described above. However, exemplary embodiments are not limited to herein: the RUI terminal apparatus 200 may be one of the second to the fourth RUI terminal apparatuses 20~40. Exemplary embodiments will be described by assuming that the first RUI terminal apparatus 10 described above is the RUI terminal apparatus 200.

Figure 6:
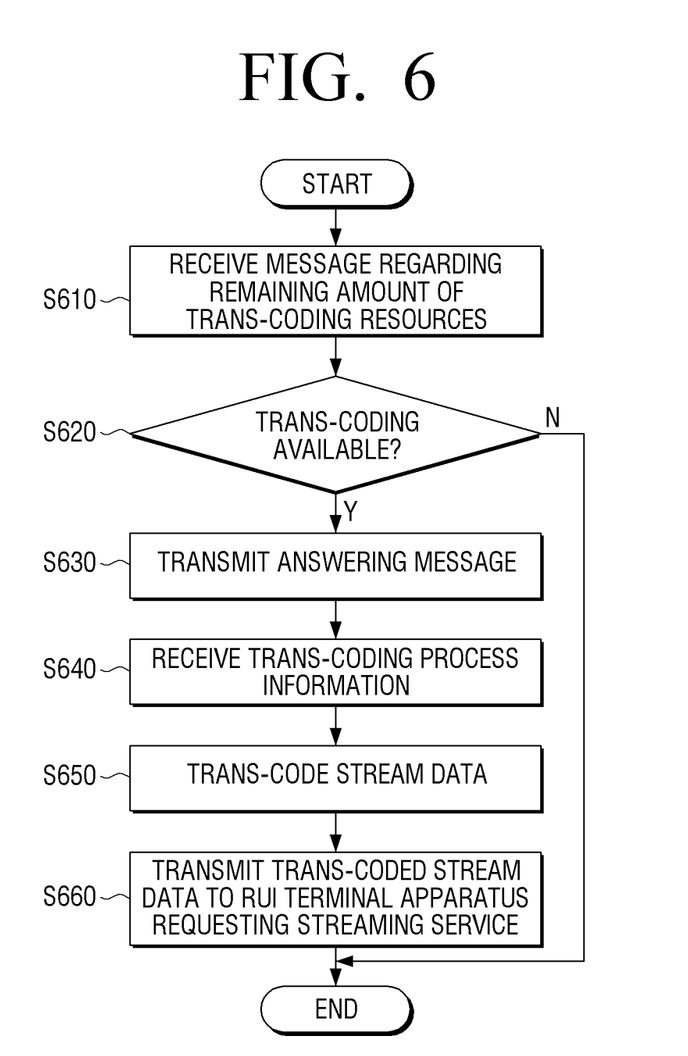
FIG. 6 is a flowchart of a method which controls an RUI terminal apparatus in an RUI service environment according to an exemplary embodiment.

FIG. 6 is a flowchart describing the controlling method of RUI terminal apparatus in RUI service environment according to an exemplary embodiment.

Referring to FIG. 6, the RUI terminal apparatus 200 receives, from RUI sever 100, a request message requesting the remaining amount of trans-coding resources, at S610. When the request message requesting the remaining amount of trans-coding resources is received, the RUI terminal apparatus 200 determines whether or not there are available trans-coding resources internally, at S620.

When it is determined that there are available trans-coding resources, the RUI terminal apparatus 200 transmits, to the RUI server 100, an answering message including amount information of the available trans-coding resources, at S630. For example, the RUI terminal apparatus 200 may perform trans-coding regarding stream data which will be simultaneously transmitted to the other three RUI terminal apparatuses at maximum, and currently may not be performing trans-coding. In this case, the RUI terminal apparatus 200 may determine that trans-coding can be performed, and transmit an answering message regarding available trans-coding resources to the RUI server 100. However, when it is determined that there are no available trans-coding resources, the RUI terminal apparatus 200 may not transmit a separate answering message to the RUI server 100.

When trans-coding process information including stream data is received from the RUI server 100, after transmitting the answering message regarding available trans-coding resources to the server 100, the RUI terminal apparatus 200 performs trans-coding corresponding stream data in the format of the other RUI terminal apparatus 200 requesting a streaming service based on the received trans-coding process information, at S640 and S650. Herein, the trans-coding process information may further include identifier information (or address information) and format specification information regarding the other terminal apparatuses 200 requesting a streaming service. Thus, the RUI terminal apparatus 200 trans-codes corresponding stream data into a format corresponding to the format specification information included in the trans-coding process information. Thereafter, the RUI terminal apparatus 200 transmits the trans-coded stream data to the other RUI terminal apparatus 200 requesting a streaming service, based on the trans-coding process information, at S660.

Therefore, the other RUI terminal apparatus 200 requesting a streaming service may receive and output the trans-coded stream data regarding the contents requested by itself from the RUI terminal apparatus 200.

As described above, according to various exemplary embodiments, an RUI server may provide an RUI service by utilizing trans-coding resources of RUI terminal apparatuses that can provide trans-coding resources among the plurality of RUI terminal apparatuses, when trans-coding resources are needed.

The foregoing exemplary embodiments and advantages are merely exemplary and are not to be construed as limiting the exemplary embodiments. The present teaching can be readily applied to other types of apparatuses, and many alternatives, modifications, and variations will be apparent to those skilled in the art. Also, the description of the exemplary embodiments is intended to be illustrative, and not to limit the scope of the inventive concept, as defined by the appended claims.

What is claimed is:

1. A controlling method of a remote user interface (RUI) server in an RUI service environment, the controlling method comprising:
   receiving, at the RUI server, stream data from an external server in response to the external server receiving streaming service request information from a first RUI terminal among a plurality of RUI terminals;
   determining whether the RUI server has enough trans-coding resources to perform trans-coding of the received stream data, to yield a determination;
   in response to the determination indicating that the RUI server has the enough trans-coding resources, trans-coding the received stream data by the RUI server; and
   in response to the determination indicating that the RUI server does not have the enough trans-coding resources, transmitting a request to trans-code the received stream data to a second RUI terminal among the plurality of RUI terminals, the second RUI terminal being different from the first RUI terminal.

2. The controlling method of claim 1, wherein the streaming service request information comprises at least one of contents information, identifier information, and format specification information regarding the first RUI terminal.

3. The controlling method of claim 2, wherein the determining comprises:
   determining whether it is necessary to trans-code the received stream data based on the format specification information included in the streaming service request information, to yield a second determination;
   transmitting the received stream data to the first RUI terminal in response to the second determination indicating that trans-coding is unnecessary.

4. The controlling method of claim 2, wherein the trans-coding the received stream data comprises:
   trans-coding the received stream data into a format corresponding to the format specification information, to yield trans-coded stream data; and
   transmitting the trans-coded stream data to the first RUI terminal.

5. The controlling method of claim 1, wherein the transmitting the request comprises:
   transmitting the request to the plurality of RUI terminals except for the first RUI terminal;
   receiving an answer message from the second RUI terminal, the second RUI terminal being capable of providing trans-coding resources; and
   transmitting trans-coding process information regarding the received stream data to the second RUI terminal.

6. The controlling method of claim 5, wherein the trans-coding process information comprises the received stream data, identifier information, and format specification information regarding the first RUI terminal, and
   wherein the second RUI terminal trans-codes the received stream data based on the received stream data and the format specification information to yield trans-coded stream data, and transmits the trans-coded stream data to the first RUI terminal based on the identifier information.

7. The controlling method of claim 1, wherein the transmitting the request further comprises:
   transmitting, to the first RUI terminal, a message informing the first RUI terminal that a streaming service corresponding to the streaming service request information cannot be provided, in response to the second RUI terminal not responding to the request with an answer message.

8. A controlling method of a first remote user interface (RUI) terminal in an RUI service environment, the controlling method comprising:
   receiving, from an RUI server, a request to trans-code stream data, in response to the RUI server determining that the RUI server does not have enough trans-coding resources to trans-code the stream data;
   transmitting, to the RUI server, an answer message regarding available trans-coding resources of the first RUI terminal;
   receiving, from the RUI server, trans-coding process information including the stream data;
   trans-coding the stream data into a format of a second RUI terminal which requests a streaming service, based on the trans-coding process information, to yield trans-coded stream data; and
   transmitting the trans-coded stream data to the second RUI terminal.

9. The controlling method of claim 8, wherein the trans-coding process information further comprises identifier information and format specification information regarding the second RUI terminal.

10. A remote user interface (RUI) server comprising:
    a communication interface configured to communicate with a plurality of RUI terminals regarding a streaming service; and
    a processor configured to:
       receive, from an external server, stream data related to streaming service request information received from a first RUI terminal among the plurality of RUI terminals,
       determine whether the RUI server has enough trans-coding resources to trans-code the received stream data, to yield a determination,
       in response to the determination indicating that the RUI server has the enough trans-coding resources, trans-code the received stream data, and
       in response to the determination indicating that the RUI server does not have the enough trans-coding resources, transmit a request to trans-code the received stream data to a second RUI terminal among the plurality of RUI terminals, the second RUI terminal being different from the first RUI terminal.

11. The RUI server of claim 10, wherein the streaming service request information comprises at least one of contents information, identifier information, and format specification information regarding the first RUI terminal.

12. The RUI server of claim 11, wherein the processor is further configured to:
   determine whether it is necessary to trans-code the received stream data based on the format specification information included in the streaming service request information, to yield a second determination, and
   in response to the second determination indicating that trans-coding in unnecessary, transmit the received stream data to the first RUI terminal.

13. The RUI server of claim 11, wherein the processor is further configured to, in response to the determination indicating that the RUI server has the enough trans-coding resources, trans-code the received stream data into a format corresponding to the format specification information to yield trans-coded stream data, and transmit the trans-coded stream data to the first RUI terminal.

14. The RUI server of claim 10, wherein the processor is further configured to:
   in response to the determination indicating that the RUI server does not have the enough trans-coding resources, transmit the request to the plurality of RUI terminals except for the first RUI terminal,
   receiving an answer message from the second RUI terminal, the second terminal being capable of providing trans-coding resources; and
   transmit trans-coding process information regarding received the stream data to the second RUI terminal.

15. The RUI server of claim 14, wherein the trans-coding process information comprises the stream data, identifier information, and format specification information of the first RUI terminal, and
   wherein the second RUI terminal which receives the trans-coding process information is configured to trans-code the received stream data based on the received stream data and the format specification information included in the trans-coding process information to yield trans-coded stream data, and transmit the trans-coded stream data to the first RUI terminal apparatus based on the identifier information.

16. The RUI server of claim 10, wherein the processor is further configured to transmit, to the first RUI terminal, a message informing the first RUI terminal that the streaming service corresponding to the streaming service request information cannot be provided, in response to the second RUI terminal not responding to the request with an answer message.

17. A remote user interface (RUI) terminal apparatus, comprising:
   a communication interface configured to communicate with an RUI server; and
   a processor configured to:
      receive, from the RUI server, a request to trans-code stream data, in response to the RUI server determining that the RUI server does not have enough trans-coding resources to trans-code the stream data,
      transmit, to the RUI server, an answer message regarding available trans-coding resources of the RUI terminal,
      receive, from the RUI server, trans-coding process information including the stream data,
      trans-code the stream data into a format of another RUI terminal requesting a streaming service, based on the trans-coding process information, to yield trans-coded stream data, and
      transmit the trans-coded stream data to the another RUI terminal.

18. The RUI terminal apparatus of claim 17, wherein the trans-coding process information comprises identifier information and format specification information regarding the another RUI terminal.

19. A remote user interface (RUI) system configured to provide an RUI service, the RUI system comprising:
   an RUI server configured to trans-code stream data received from an external server, and transmit the trans-coded stream data to a first RUI terminal which requests a streaming service, the first RUI terminal being one among a plurality of RUI terminals; and
   the first RUI terminal apparatus configured to perform signal processing on the stream data trans-coded by the RUI server and output a result of the signal processing,
   wherein the RUI server is further configured to, in response to the RUI receiving streaming service request information from the first RUI terminal and upon determining that the RUI terminal does not have enough trans-coding resources to trans-code the stream data, transmit, to a second RUI terminal among the plurality of RUI terminals, a request to trans-code the received stream data, the second RUI terminal being capable of providing available trans-coding resources.

20. The RUI system of claim 19, wherein the RUI server is further configured to transmit, to the second RUI terminal, trans-coding process information comprising the stream data, identifier information, and format specification information regarding the streaming service requested from the first RUI terminal, and
   the second RUI terminal is configured to, in response to receiving the trans-coding process information from the RUI server, trans-code the received stream data based on the received stream data and the format specification information included in the trans-coding process information to yield trans-coded stream data, and transmit the trans-coded stream data to the first RUI terminal based on the identifier information.

* * * * *